United States Patent
Mittendorf et al.

(10) Patent No.: US 9,914,182 B2
(45) Date of Patent: Mar. 13, 2018

(54) METHODS FOR FABRICATING GAS TURBINE ENGINE COMPONENTS USING A STEPPED TRANSIENT LIQUID PHASE JOINING PROCESS

(71) Applicant: HONEYWELL INTERNATIONAL INC., Morristown, NJ (US)

(72) Inventors: Don Mittendorf, Mesa, AZ (US); Christopher David Gatto, Gilbert, AZ (US); Leticia Lara, Phoenix, AZ (US); Megan Kemp, Chandler, AZ (US); Andy Szuromi, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 334 days.

(21) Appl. No.: 14/857,050

(22) Filed: Sep. 17, 2015

(65) Prior Publication Data

US 2017/0080521 A1   Mar. 23, 2017

(51) Int. Cl.
| | |
|---|---|
| *B23K 1/00* | (2006.01) |
| *B23K 20/16* | (2006.01) |
| *B23K 35/30* | (2006.01) |
| *B23K 101/00* | (2006.01) |

(52) U.S. Cl.
CPC .......... *B23K 20/16* (2013.01); *B23K 35/3033* (2013.01); *B23K 2201/001* (2013.01)

(58) Field of Classification Search
CPC .............................. B23K 20/02; B23K 1/0018
USPC .......... 29/889.1, 889.7; 228/119, 245, 248.1, 228/262.3
See application file for complete search history.

(56) References Cited

U.S. PATENT DOCUMENTS

| | | | |
|---|---|---|---|
| 3,678,570 A | 7/1972 | Paulonis et al. | |
| 4,921,405 A | 5/1990 | Wilson | |
| 5,609,471 A | 3/1997 | Frasier et al. | |
| 5,836,075 A | 11/1998 | Fitzgerald et al. | |
| 6,629,368 B2 * | 10/2003 | Schnell ................ | B23K 35/304 228/119 |
| 7,565,996 B2 | 7/2009 | Das | |
| 7,651,023 B2 | 1/2010 | Huang et al. | |
| 8,206,117 B2 | 6/2012 | Strangman et al. | |
| 2006/0283921 A1 | 12/2006 | Ciona et al. | |
| 2009/0049794 A1 | 2/2009 | Barone et al. | |
| 2014/0130353 A1 | 5/2014 | Kington et al. | |

\* cited by examiner

*Primary Examiner* — Erin B Saad
(74) *Attorney, Agent, or Firm* — Lorenz & Kopf, LLP

(57) ABSTRACT

A method for transient liquid phase bonding two metallic substrate segments together including the steps of forming a joined component by bringing together the two substrate segments along a bond line with a brazing alloy comprising a melting point depressant disposed between the two segments at the bond line and performing a first thermal treatment including heating the joined component at a brazing temperature of the brazing alloy for a first period of time. The method further includes performing a second thermal treatment including heating the joined component at an intermediate temperature that is above the brazing temperature but below a gamma prime solvus temperature of the substrate segments for a second period of time and performing a third thermal treatment including heating the joined component at a super-solvus temperature that is above the gamma prime solvus temperature of the two metallic substrate segments for a third period of time.

20 Claims, 3 Drawing Sheets

METHODS FOR FABRICATING GAS TURBINE ENGINE COMPONENTS USING A STEPPED TRANSIENT LIQUID PHASE JOINING PROCESS

STATEMENT REGARDING FEDERALLY SPONSORED RESEARCH OR DEVELOPMENT

This invention was made with Government support under W911W6-08-2-0001 awarded by the US Army. The Government has certain rights in the invention.

TECHNICAL FIELD

The present disclosure relates to methods for fabricating gas turbine engine components. More particularly, the present disclosure relates to methods for fabricating a blade ring of a gas turbine engine using a stepped transient liquid phase joining process.

BACKGROUND

A gas turbine engine may be used to power various types of vehicles and systems. A particular type of gas turbine engine that may be used to power aircraft is a turbofan gas turbine engine. A turbofan gas turbine engine may include, for example, five major sections: a fan section, a compressor section, a combustor section, a turbine section, and an exhaust section. Another type of gas turbine engine that may be used to power aircraft systems is the auxiliary power unit (APU).

Gas turbine engines, such as the ones described above, typically operate more efficiently at increasingly higher temperatures. However, some turbine engine components, such as turbine blades and hubs, may experience greater degradation at higher temperatures. In addition, conventional blade configurations may not be ideal for the demanding performance requirements of next generation small gas generator turbine rotors.

In the past, turbine rotors have typically been fabricated as individual blade castings that are machined at the root and inserted into an inner hub which has been machined to accept the blade root machined contour. However, this configuration may result in non-ideal stress concentrations between the inner hub, the blade root, and/or the turbine blades.

More recently, a bonded dual alloy turbine wheel with single crystal blades has been proposed, which has performance advantages over mechanically attached blade designs. To facilitate producing a bonded single crystal blade dual alloy turbine wheel, the blades need to be a solid ring structure but with each blade single crystal aligned with the radial direction of the wheel. The interface between blade single crystals needs to mechanically behave with near parent metal properties.

Single crystal blade rings have been produced with transient liquid phase (TLP) bonding techniques to facilitate HIP bonding to a differing hub material. However standard TLP bonding techniques do not result in strong bonds at elevated temperatures as can be required from some applications. The lower strength is a result of a bond interface composition and microstructure that is quite different than the parent single crystal composition and microstructure. Thus, the prior art remains deficient.

Accordingly, it is desirable to provide a turbine engine rotor that is stronger and/or that exhibits increased reliability and/or durability. It is further desirable to provide a turbine engine rotor that results in improved performance. Furthermore, other desirable features and characteristics of the present disclosure will be apparent from the subsequent detailed description and the appended claims, taken in conjunction with the accompanying drawings and the foregoing technical field and background.

BRIEF SUMMARY

Methods for fabricating gas turbine engine components using a stepped transient liquid phase bonding process are disclosed. In one embodiment, a method for transient liquid phase bonding two metallic substrate segments together including the steps of forming a joined component by bringing together the two substrate segments along a bond line with a brazing alloy including a melting point depressant disposed between the two substrate segments at the bond line and performing a first thermal treatment including heating the joined component at a brazing temperature of the brazing alloy for a first period of time. The method further includes performing a second thermal treatment, subsequent to the first thermal treatment, including heating the joined component at an intermediate temperature that is above the brazing temperature but below a gamma prime solvus temperature of the two metallic substrate segments for a second period of time and performing a third thermal treatment, subsequent to the second thermal treatment, including heating the joined component at a super-solvus temperature that is above the gamma prime solvus temperature of the two metallic substrate segments for a third period of time. Still further, the method includes subsequent to performing the third thermal treatment, cooling the joined component to a temperature that is below the brazing temperature within a fourth period of time.

In another embodiment, a method for fabricating a bladed disk for use in a gas turbine engine includes the step of forming a bladed disk ring, which itself includes the following five steps: 1) joining together a plurality of metallic ring arc segments along bond lines, with a brazing alloy including a melting point depressant disposed between each of the ring arc segments at the bond line, to form a ring structure; 2) performing a first thermal treatment including heating the ring structure at a brazing temperature of the brazing alloy for a first period of time; 3) performing a second thermal treatment, subsequent to the first thermal treatment, including heating the ring structure at an intermediate temperature that is above the brazing temperature but below a gamma prime solvus temperature of the two metallic substrate segments for a second period of time; 4) performing a third thermal treatment, subsequent to the second thermal treatment, including heating the ring structure at a super-solvus temperature that is above the gamma prime solvus temperature of the two metallic substrate segments for a third period of time; and 5) subsequent to performing the third thermal treatment, cooling the ring structure to a temperature that is below the brazing temperature within a fourth period of time. The method for fabricating the bladed disk further includes, subsequent to the cooling, bonding the ring structure to a hub, subsequent to bonding the ring structure to the hub, machining a plurality of slots into the ring structure, and inserting a blade into each of the plurality of slots to form the bladed disk.

This brief summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

BRIEF INTRODUCTION OF THE DISCLOSURE

Embodiments of the present disclosure are generally directed to methods for fabricating gas turbine engine components, and more particularly are directed to "stepped" transient liquid phase (TLP) joining processes for fabricating a blade ring in the assembly of a bladed disk for use in a gas turbine engine. The stepped TLP joining process disclosed herein uses a conventional braze alloy, such as a nickel-boron braze alloy, with a nominal thickness of about 1 mil for example, placed between two ring segments to be joined. The TLP joining process starts with thermal exposure consistent with the recommended brazing temperature of the braze alloy to allow for capillary action in the bond joint. The hold time at this initial bond temperature is greater than an hour to facilitate diffusion of the boron into the substrate (i.e., the ring segments) and subsequent solidification of the braze filler at the bonding temperature. The stepped TLP joining process then continues with further thermal exposure at one or more increased temperature(s) that is/are greater than the initial temperature yet lower than the gamma prime solvus temperature of the substrate ring segments. Each subsequent thermal exposure at increased temperature is held for a period of time, which depends on the temperature selected. After the thermal exposure at the one or more increased temperature(s) is complete, a final thermal "soak" is performed at a temperature above the gamma prime solvus for a period of time. Thereafter, a fast cooling procedure to bring the substrate below the initial temperature is performed. This stepped TLP process allows the bond joint to respond to heat treatment similar to the substrate ring segments, and thus beneficially achieves the states goals of improved durability and high temperature performance of the resulting gas turbine engine component.

Figure 1:
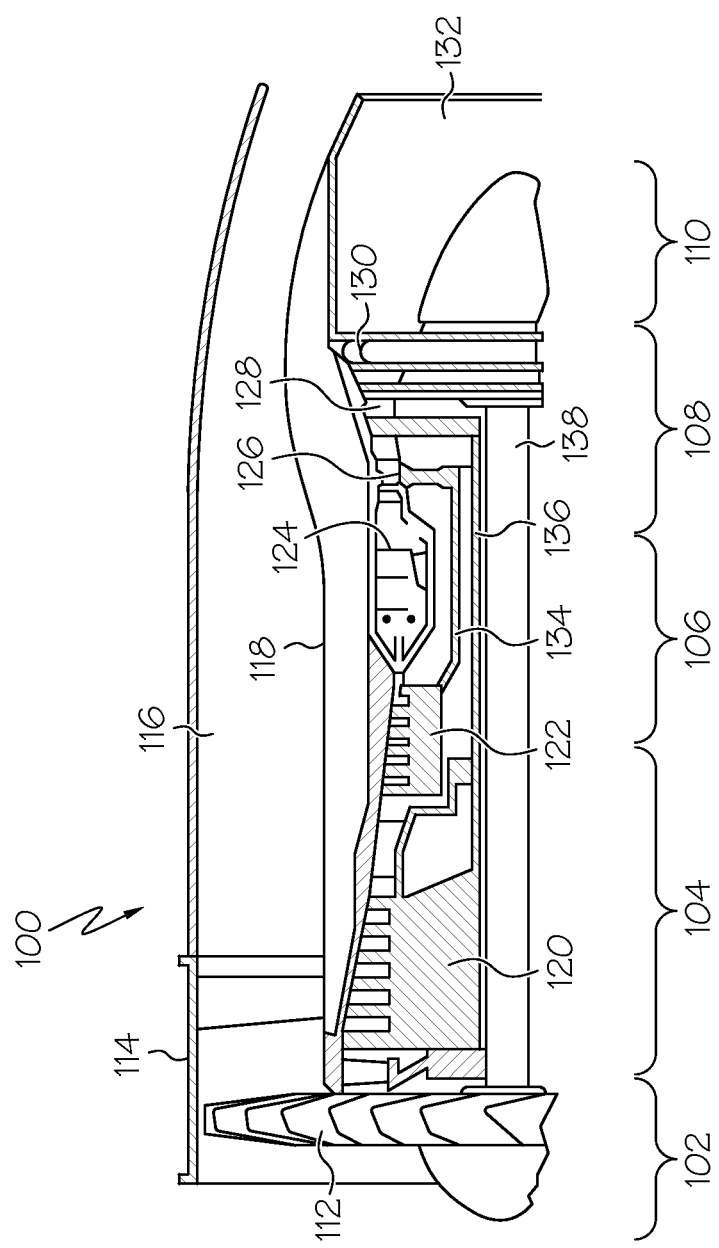
FIG. 1 is a simplified cross-sectional side view of an annular multi-spool turbofan gas turbine jet engine in accordance with an exemplary embodiment of the present disclosure.

This disclosure initially presents an exemplary gas turbine engine in FIG. 1, which serves as an exemplary implementation for a gas turbine engine component fabricated in accordance with the present disclosure (other implementations include an APU, for example). This disclosure then presents in FIG. 2 an assembled gas turbine engine component fabricated in accordance with the present disclosure that may form a part of the gas turbine engine shown in FIG. 1. Thereafter, in FIGS. 3 and 4, this disclosure presents an exemplary method, utilizing a stepped TLP joining process, for fabricating the gas turbine engine component shown in FIG. 2.

Exemplary Gas Turbine Engine

An exemplary embodiment of an upper portion of an annular multi-spool turbofan gas turbine jet engine 100 is depicted in FIG. 1. As shown in FIG. 1, the engine 100 is annular around an axis 101. The engine 100 includes an intake section 102, a compressor section 104, a combustion section 106, a turbine section 108, and an exhaust section 110. The intake section 102 includes a fan 112, which is mounted in a fan case 114. The fan 112 draws air into the intake section 102 and accelerates it. A fraction of the accelerated air exhausted from the fan 112 is directed through a bypass section 116 disposed between the fan case 114 and an engine cowl 118, and provides a forward thrust. The remaining fraction of air exhausted from the fan 112 is directed into the compressor section 104.

The compressor section 104 includes two compressors, an intermediate pressure compressor 120, and a high pressure compressor 122. The intermediate pressure compressor 120 raises the pressure of the air directed into it from the fan 112 and directs the compressed air into the high pressure compressor 122. The high pressure compressor 122 compresses the air still further, and directs a majority of the high pressure air into the combustion section 106. In addition, a fraction of the compressed air bypasses the combustion section 106 and is used to cool, among other components, turbine blades in the turbine section 108. In the combustion section 106, which includes an annular combustor 124, the high pressure air is mixed with fuel and combusted. The high-temperature combusted air is then directed into the turbine section 108.

The turbine section 108 includes three turbines disposed in axial flow series, a high pressure turbine 126, an intermediate pressure turbine 128, and a low pressure turbine 130. However, it will be appreciated that the number of turbines, and/or the configurations thereof, may vary, as may the number and/or configurations of various other components of the exemplary engine 100. The high-temperature combusted air from the combustion section 106 expands through each turbine, causing it to rotate. The air is then exhausted through a propulsion nozzle 132 disposed in the exhaust section 110, providing additional forward thrust. As the turbines rotate, each drives equipment in the engine 100 via concentrically disposed shafts or spools. Specifically, the high pressure turbine 126 drives the high pressure compressor 122 via a high pressure shaft 134, the intermediate pressure turbine 128 drives the intermediate pressure compressor 120 via an intermediate pressure shaft 136, and the low pressure turbine 130 drives the fan 112 via a low pressure shaft 138.

Each of the turbines 126-130 in the turbine section 108 includes a plurality of stators (not shown in FIG. 1) and turbine blades (not shown in FIG. 1). The stators are used to direct a portion of the combusted air from the combustion section 106 onto the rotary blades. The rotary blades in turn cause the associated turbines 126-130 to rotate.

Exemplary Gas Turbine Engine Component

Figure 2:
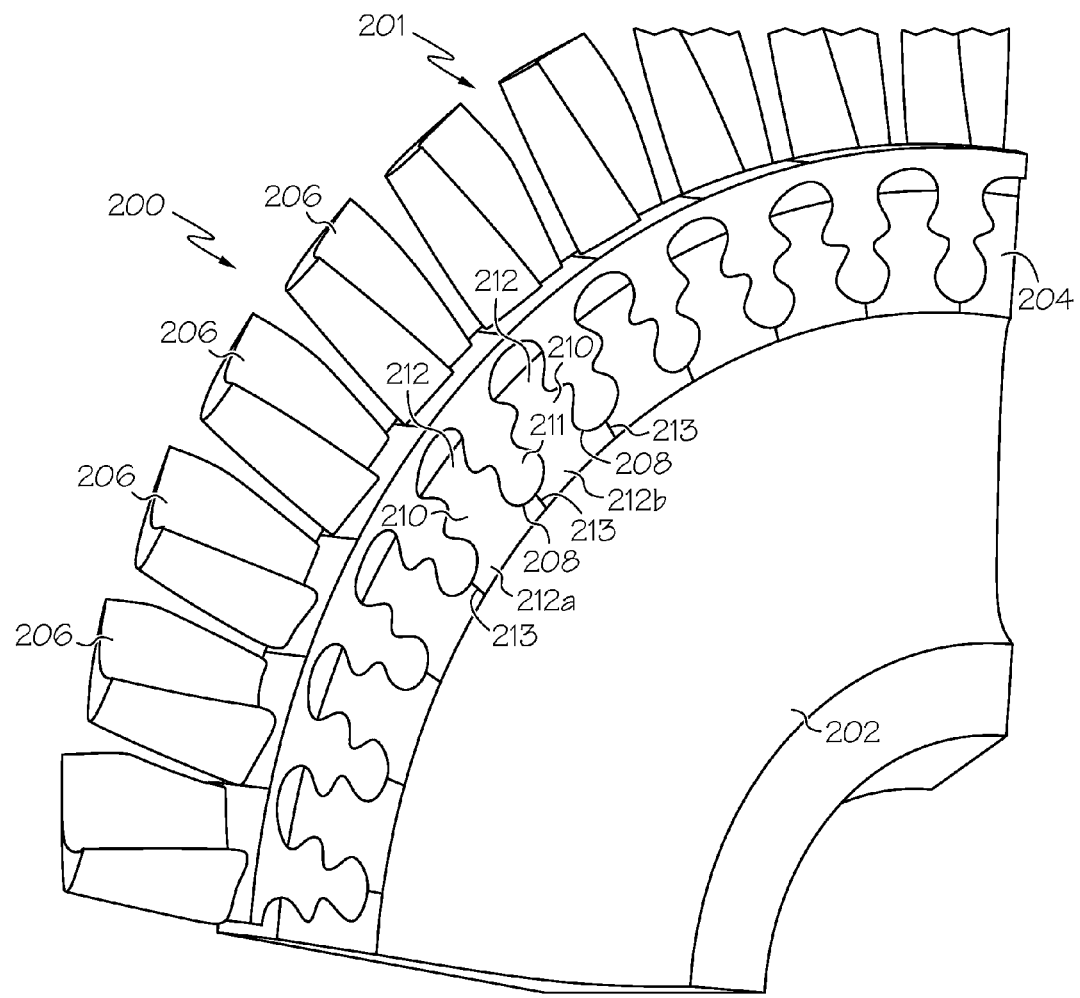
FIG. 2 is a close up view of a portion of a bladed disk that may form a part of the gas turbine engine, according to an exemplary embodiment of the present disclosure.

FIG. 2 provides a simplified cross sectional view, looking along the centerline, of a first exemplary embodiment of a turbine rotor component 200 embodied as a bladed disk that can be used in any one of a number of different types of turbines, including, among others, high, intermediate, and low pressure turbines 126, 128, and 130 of the turbine section 108 of the engine 100 of FIG. 1. The bladed disk 200 can also be used in connection with any number of other different types of engines, devices, and systems. The bladed disk 200 may be included of a hub 202, a ring 204, and a plurality of blades or airfoils 206. The hub 202 may be configured to mount to a rotatable shaft (not shown) and to withstand elevated temperatures, such as up to about 700° C. In an embodiment, the hub 202 may include a first material capable of withstanding such temperatures, and, in this regard, may be made up of a suitable superalloy material. Suitable superalloy materials include, but are not limited to, powder metallurgy nickel-based superalloys, such as Alloy 10. In an embodiment, the hub is made up of a superalloy having substantially similarly sized grains in three dimensions; thus, the hub may be made up of equiaxed superalloy material.

The ring 204 surrounds the hub 202 and may be bonded thereto. For example, the ring 204 may be diffusion bonded to the hub 202. The ring 204 also includes a plurality of slots 208 that are machined into its outer periphery. The slots 208 define a plurality of posts 210 there between and are configured to receive corresponding attachment portions 211 of the blades 206 therein. In an embodiment, the ring 204 may have between twenty-four (24) to forty-eight (48) equally spaced slots 208, and each slot 208 may include a corresponding blade 206. In other embodiments, more or fewer slots 208 and blades 206 may alternatively be incorporated.

The ring 204 and the blades 206 may be configured to exhibit different properties than the hub 202. For example, the ring 204 and the blades 206 may have compositions and microstructures configured to withstand temperatures that are higher than those to which the hub 202 may be exposed. In one embodiment, the ring 204 may be capable of withstanding temperatures in a range of between about 700° C. and about 850° C., and the blades 206 may be capable of withstanding temperatures in a range of between about 700° C. and about 1200° C. In this regard, at least the ring 204 may be made of a plurality of arc segments 212 (the boundaries (referred to as "grain boundaries" or "bond lines" below) of which are indicated by dotted lines 213) that each include single crystal material, where the single crystal material is configured to have a predetermined crystallographic orientation.

As used herein, the phrase "single crystal" may refer to a material in which substantially all of the material has a single crystallographic orientation, without the presence of high angle grain boundaries (e.g., greater than about 15 degrees). A small amount of low angle grain boundaries (e.g., less than about 15 degrees), such as tilt or twist boundaries, may be present in the single crystal material. Other minor irregularities are also permitted within the scope of the term "single crystal." For example, small areas of high angle grain boundaries may be formed due to the inability of the single crystal to grow perfectly. Such deviations from a perfect single crystal, which are found in normal commercial production operations, may be within the scope of the term "single crystal" as used herein.

In an embodiment, low-angle grain boundaries 213 may exist between adjacent arc segments. A low-angle grain boundary 213 may be defined as an amount of misorientation that adjacent arc segments can tolerate without a significant reduction in mechanical properties, such as creep life. Using this criterion, low-angle grain boundaries in commercial single crystal superalloys range between about 8 degrees to about 18 degrees.

In any case, the ring 204 may be made of any one of numerous materials capable of forming single crystal materials. For example, when low-angle grain boundaries 213 will exist between adjacent arc segments 212a, 212b suitable single crystal materials including investment cast nickel superalloys that contains a concentration of one or more grain boundary strengthening elements (Hf, C, B, Zr) that is sufficient to substantially avoid a stress-rupture debit may be used. An example of a suitable material for such case is a single crystal material including nickel-based CMSX-486® superalloy, as manufactured by the Cannon-Muskegon Corporation of Muskegon, Mich. CMSX-486® superalloy may be included of about 61.41 weight percent nickel, about 9.3 weight percent cobalt, about 4.8 weight percent chromium, about 8.6 weight percent tungsten, about 4.5 weight percent tantalum, about 0.7 weight percent molybdenum, about 3.0 percent rhenium, about 5.7 weight percent aluminum, about 0.7 weight percent titanium, about 1.2 weight percent hafnium, about 0.07 weight percent carbon, about 0.015 weight percent boron, and about 0.005 weight percent zirconium. This single crystal alloy can tolerate low-angle grain boundaries up to about 18 degrees. Another suitable single crystal superalloy for the arc segments includes SC180, available through Honeywell International, Inc. of Morristown, N.J. The composition of SC180 may be included of about 60.45 weight percent nickel, about 10.0 weight percent cobalt, about 5.0 weight percent chromium, about 5.0 weight percent tungsten, about 8.5 weight percent tantalum, about 1.7 weight percent molybdenum, about 3.0 percent rhenium, about 5.5 weight percent aluminum, about 0.75 weight percent titanium, and about 0.1 weight percent hafnium.

As briefly mentioned above, the plurality of arc segments 212 making up the ring 204 each has a predetermined crystallographic orientation. In particular, each arc segment 212 may have a predetermined primary orientation and a predetermined secondary orientation. In an embodiment, the predetermined primary orientation of each arc segment may be substantially equal, and each predetermined secondary orientation of each arc segment may be substantially equal, where the predetermined primary orientation may be a radial orientation and the secondary orientation may be a circumferential orientation, for example. In an embodiment, grain boundaries 213 that are oriented perpendicular to the radial orientation of the ring 204 may be substantially absent within individual arc segments. In such case, the absence of grain boundaries may inhibit creep and sustained peak low cycle fatigue crack propagation in the disk posts 210, when the bladed disk 200 operates at temperatures in a range of between about 700° C. and about 850° C.

Similar to the ring 204, each blade 206 may be made of a material having a predetermined primary orientation and a predetermined secondary orientation. In an embodiment, the predetermined primary and secondary orientation of a blade 206 may be substantially equal to the predetermined primary and secondary orientation of an adjacent portion of the ring 204 (e.g., arc segment 212 or corresponding posts 210), where the predetermined primary orientation is a radial orientation and the secondary orientation is a circumferential orientation. The blades 206 may be made of any one of numerous materials capable of being configured to exhibit the aforementioned properties. Examples of suitable materials include, but are not limited to, nickel-based alloys, such SC180.

Exemplary Fabrication Method Utilizing Stepped TLP Joining Process

Figure 3:
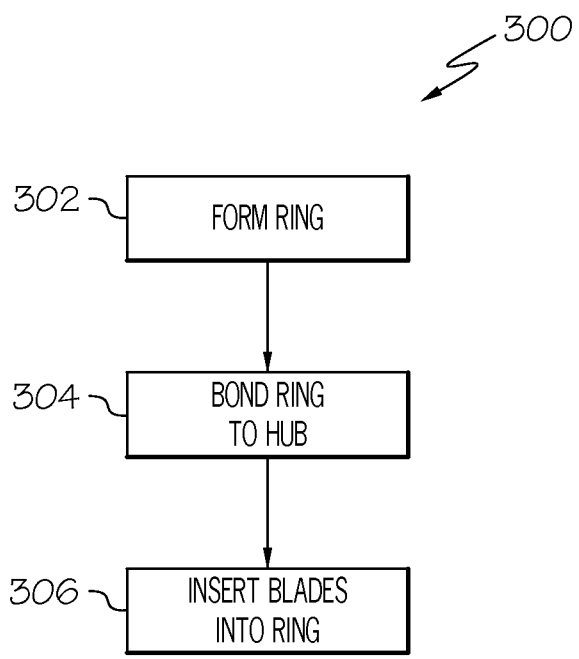
FIG. 3 is a method of manufacturing a bladed disk as shown in FIG. 2, according to an exemplary embodiment of the present disclosure.
Figure 4:
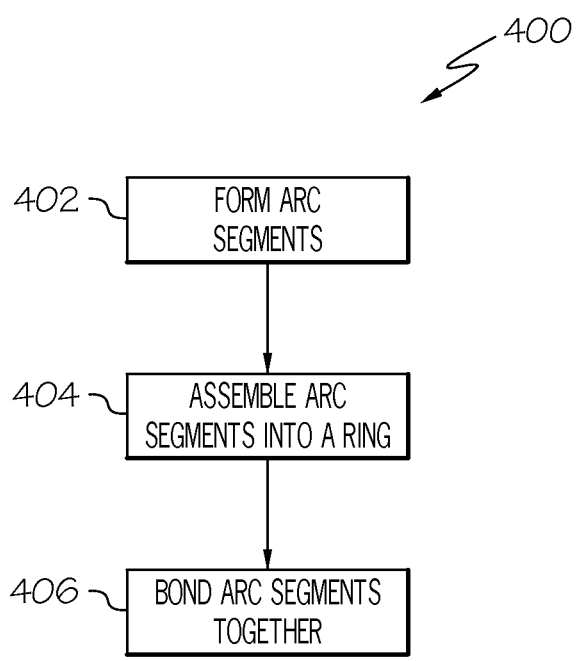
FIG. 4 is a method for forming a bonded ring using a stepped TLP process for a rim of the bladed disk of FIG. 2 from a plurality of arc segments, according to an exemplary embodiment of the present disclosure.

To manufacture the above-described bladed disk 200, a method 300 shown in FIG. 3 may be employed. According to an embodiment, a ring is first formed, step 302, utilizing the stepped TLP joining process of the present disclosure. The ring is bonded to a hub to form a disk, step 304. Then, blades are inserted into the disk to form a turbine component, step 308. Each of these steps will now be discussed in more detail below.

As mentioned briefly above, the ring is first formed, step 302. One example of forming the ring includes forming the ring from a plurality of individual arc segments, as depicted in a method 400 in FIG. 4. In this embodiment, the method 400 includes forming the individual arc segments, step 402. In an embodiment, the individual arc segments may be formed by investment casting single crystal superalloy material into single crystal arc segments. The arc segments may then be solution heat treated (to improve creep strength) and inspected for desired primary and secondary orientations. Subsequently, surfaces of the arc segments may be machined in preparation for bonding.

The individual arc segments are assembled into a ring, step 404, and bonded together, step 406, utilizing a stepped TLP joining processes as described in greater detail below. The bonded ring forms a full ring including a plurality of arc segments having bond lines therebetween. To this end, the arc segments may be placed in a bonding fixture and joined together.

Transient liquid phase ("TLP") bonding is a type of brazing and diffusion bonding process wherein interlayer materials are disposed between substrates being bonded to form an assembly. TLP bonding allows a bond to be formed at a low temperature, while the re-melting temperature of the resulting bond is much higher. When the assembly is held together and heated to the bonding temperature, at least some of the interlayer materials melt, filling in the gaps between the substrates. While the assembly is held at the bonding temperature, inter-diffusion of certain alloying elements occurs between the interlayer and the substrates, causing a compositional change at the joint, which isothermally solidifies the joint and creates an initial bond between the substrates. Holding the assembly at the bonding temperature for a longer period of time allows a diffusion bond having a substantially homogenous microstructure to form between the substrates. TLP bonding systems and methods may utilize various forms of bonding medium, such as, for example, thin foils, powders, pastes, cloths, tapes, honeycombs, thin coatings, etc.

The TLP bonding medium/material preferably includes an alloy that is the same as, or similar to, the substrate alloy of the sub-structure (i.e., the ring arc segments), with the addition of a melting point depressant (referred to as a TLP bonding agent). The blades and vanes of combustion turbines that can be constructed in accordance with the disclosure generally include a nickel-based superalloy, however, the present disclosure is not intended to be limited to these superalloy blade and vane designs. The melting point depressant material is preferably boron, with another melting point depressant material being silicon. In any case, the transient liquid phase bond material may be applied to a thickness, such as between about 2 microns and 50 microns, commonly 25 microns. In other embodiments, more or less may be alternatively applied.

After the TLP bond material is applied to the mating surfaces of the ring arc segments to be joined together, the mating surfaces are aligned and then coupled together such that the bond material layer is sandwiched between opposed mating surfaces. This joined component structure is then subjected to a stepped TLP joining process. The stepped TLP joining process begins with an initial thermal exposure at the recommended brazing temperature of the bonding medium, for a period of time that is at least one hour. During this thermal process the melting point depressant elements will diffuse and dilute into the substrate causing a melting character change leading to isothermal solidification. For example, in the preferred example of a nickel-boron alloy bonding medium, the recommended brazing temperature ranges from about 980 degrees C. to about 1200 degrees C. While the minimum time of thermal exposure at this initial temperature is at least one hour, the time period may extend up to about 4 hours.

After the initial thermal exposure period at the recommended brazing temperature of the bond material, at least one subsequent thermal exposure period is performed, wherein the temperature is "stepped" up to a temperature that is greater than the initial temperature (i.e., the recommended braze temperature), yet less than the gamma prime solvus temperature of the superalloy forming the ring arc segments, the gamma prime solvus temperature typically ranging from about 1290 degrees C. to about 1325 degrees C. It is thus convenient to define a temperature range (R) that begins at the recommended braze temperature and ends at the gamma prime solvus temperature of the ring arc superalloy. The at least one subsequent thermal exposure temperature thus falls within this range R. The period of time for exposure at this at least one stepped-up temperature may be from about 10 minutes to about 4 hours. Without re-melting the braze alloy this step allows for further diffusion of the melting point depressants but also allowing for diffusion of the substrate elements into the braze alloy to facilitate homogenization and to achieve the same or similar microstructure in the braze bond region as with the substrate.

Each of the at least one stepped-up thermal exposure periods may be referred to as an intermediate thermal exposure period. In practice, one, two, three, four, or more intermediate thermal exposure periods may be performed. This disclosure should not be understood as limiting to any particular number of intermediate thermal exposure periods. When two or more intermediate thermal exposure periods are utilized, it will typically be the case that the second (and subsequent) intermediate thermal exposure periods will be performed at a temperature that is greater than the immediately preceding intermediate thermal exposure period to enhance the elemental mixing but without melting. However, it should also be possible to have one or more of the intermediate thermal exposure periods be performed at a temperature that is below the immediately preceding intermediate thermal exposure period.

The exact number, sequence, temperature, and time period for each intermediate thermal exposure period may be determined based on a particular embodiment, which depends of the bond material used, the substrate used, and the size of the component to be fabricated, for example. One skilled in the art will be able to optimize these process conditions based on the disclosure presented herein. To give a few non-limiting examples, where one intermediate thermal exposure period is desired, the temperature at which it is performed may fall between the lower decile and the upper decile of the range R, for example, between the lower quartile and the upper quartile of the range R, such as between the lower third and the upper third of the range R. Where two intermediate thermal exposure periods are desired, the first such period may be performed at a temperature that falls between the lower decile and the midpoint of range R, such as between the lower quartile and the midpoint of range R; and the second such period may be performed at a temperature that falls between the midpoint and the upper decile of range R, such as between the midpoint and the upper quartile of range R. Other suitable ranges for any number of intermediate thermal exposure periods may thus be easily envisioned.

The TLP joining process of the present disclosure then continues, once all desired intermediate thermal exposure periods have been performed, with a step of exposing the component to a final thermal "soak" at a temperature that is above the gamma prime solvus of the substrate ring arcs. As used herein, the term "thermal soak" refers to a thermal exposure at the stated temperature for a period of time that ranges from about 10 minutes to about 4 hours. The amount above the gamma prime solvus may be anywhere from 5 degrees C., 10 degrees C., 20 degrees C., 50 degrees C., or more, above the gamma prime solvus without causing a melt of either the substrate of the bond region.

After the thermal soak procedure, the component is then cooled relatively quickly to a temperature that is below the initial thermal exposure temperature (i.e., the recommended braze temperature). As used herein, the term "relatively quickly" refers to cooling that is performed within a period of time that ranges from about 10° C./min to about 100° C./min. The TLP joining process and solution heat treatment is thus completed.

Returning to FIG. 3, the ring is bonded to a hub to form a dual alloy turbine disk, step 304. The hub may be made by a conventional process, such as by powder metallurgy. In an embodiment, as mentioned above, the hub may include a material that is different from the material from which the ring is made. For example, the hub may be made of a nickel-based alloy formulated to withstand higher stresses and temperatures lower than those to which the ring will be subjected. In this regard, the hub may be made of an equiaxed superalloy material, which may be formed from Alloy 10, Astroloy, or U720, to name a few.

The ring and the hub may be dimensioned such that a bond line is formed at a location where exposure to temperatures may not exceed about 675° C. In this regard, an inner diameter of the ring may be machined to a particular dimension before being bonded to the hub, and an outer peripheral surface of the hub may be machined to a particular dimension to improve bonding to the ring. For example, in an embodiment where the ring is shrink fit onto the hub, the inner diameter of the ring may be machined so as to be slightly less than an outer diameter of the hub. In another embodiment, the inner diameter of the ring may be substantially equal in size to the outer diameter of the hub.

In any case, the ring may be bonded to the hub using any one of numerous conventional processes. For example, the ring may be bonded to the hub using heat and pressure. In still another example, the ring may be shrink-fitted to the hub, evacuated and the joined surfaces sealed, and bonding may occur using a hot isostatic pressure process. For example, the hot isostatic pressing process parameters may include pressure, temperature, and time. In an embodiment, the hot isostatic pressing process may be performed at parameters where a selected temperature is in a range of between about 1100° C. and 1300° C. and a selected pressure is in a range of between about 15 to 30 ksi. The process may be performed for between about 2 to 8 hours. After bonding, the disk may be subjected to a heat treatment. In an embodiment, the heat treatment may occur at temperatures below the bonding temperature of the ring and the hub.

The blades may be inserted into the disk, step 308. The blades each may be substantially identical in material and configuration, in an embodiment. In any case, however, as mentioned above, each single crystal blade may have a predetermined primary orientation and a predetermined secondary orientation and is capable of withstanding temperatures within a predetermined range. Additionally, each predetermined primary orientation of each blade may be substantially equal, and each predetermined secondary orientation of each blade may be substantially equal. The predetermined range may include temperatures between about 700° C. and about 1200° C. Suitable materials capable of having the aforementioned properties include, but are not limited to SC180.

The blades may be inserted into the ring such that the predetermined primary and secondary orientations of a single crystal blade may be substantially equal to the predetermined primary and secondary orientation of adjacent portions of the ring (e.g., corresponding posts), according to an embodiment. In this way, the blades and adjacent portions of the ring may be substantially similar in modulus, which may reduce fatigue stresses as compared to adjacent components having different primary and secondary orientations. Thus, as long as adjacent portions of the two components have the same crystallographic orientation, the blades may or may not be made of material that is substantially identical to that of the ring. In other embodiments, the blades may not have substantially equal predetermined primary and secondary orientation as those of adjacent portions of the ring. In other embodiments, the blades may have an equi-axed or directionally solidified columnar grained microstructure.

Accordingly, the presented disclosure has provided embodiments directed to "stepped" transient liquid phase (TLP) joining processes for fabricating a blade ring in the assembly of a bladed disk for use in a gas turbine engine. This stepped TLP process allows the bond joint to respond to heat treatment similar to the substrate ring segments, and thus beneficially achieves the states goals of improved durability and high temperature performance of the resulting gas turbine engine component.

While the disclosure has been described with reference to a preferred embodiment, it will be understood by those skilled in the art that various changes may be made and equivalents may be substituted for elements thereof without departing from the scope of the disclosure. In addition, many modifications may be made to adapt to a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method for transient liquid phase bonding two metallic substrate segments together, the method comprising the steps of:

forming a joined component by bringing together the two substrate segments along a bond line with a brazing alloy comprising a melting point depressant disposed between the two substrate segments at the bond line;

performing a first thermal treatment comprising heating the joined component at a brazing temperature of the brazing alloy for a first period of time;

performing a second thermal treatment, subsequent to the first thermal treatment, comprising heating the joined component at an intermediate temperature that is above the brazing temperature but below a gamma prime solvus temperature of the two metallic substrate segments for a second period of time;

performing a third thermal treatment, subsequent to the second thermal treatment, comprising heating the joined component at a super-solvus temperature that is above the gamma prime solvus temperature of the two metallic substrate segments for a third period of time; and subsequent to performing the third thermal treatment, cooling the joined component to a temperature that is below the brazing temperature within a fourth period of time.

2. The method of claim 1, wherein the brazing alloy comprises a nickel-based alloy.

3. The method of claim 2, wherein the melting point depressant comprises boron.

4. The method of claim 1, wherein the first period of time is greater than about one hour.

5. The method of claim 1, wherein the second period of time is from about 10 minutes to about 4 hours.

6. The method of claim 1, wherein the third period of time is from about 10 minutes to about 4 hours.

7. The method of claim 1, wherein the fourth period of time is less than about 6 hours.

8. The method of claim 1, further comprising a performing a fourth thermal treatment after the second thermal treatment but before the third thermal treatment, wherein the fourth thermal treatment comprises heating the joined component at a further intermediate temperature that is above the brazing temperature but below the gamma prime solvus temperature of the two metallic substrate segments for a fifth period of time.

9. The method of claim 8, wherein the temperature of the fourth thermal treatment is also greater than the temperature of the second thermal treatment.

10. The method of claim 1, wherein a range R is defined as a temperature range between the brazing temperature and the gamma prime solvus temperature, and wherein the second thermal treatment is performed at a temperature between a lowest decile of the range R and an uppermost decile of the range R.

11. The method of claim 10, wherein the second thermal treatment is performed at a temperature between a lowest quartile of the range R and an uppermost quartile of the range R.

12. The method of claim 1, wherein the two metallic substrate segments comprise arcs of a bladed disk ring for use in a gas turbine engine.

13. A method for fabricating a bladed disk for use in a gas turbine engine, the method comprising the steps of:
   forming a bladed disk ring comprising:
   1) joining together a plurality of metallic ring arc segments along bond lines, with a brazing alloy comprising a melting point depressant disposed between each of the ring arc segments at the bond line, to form a ring structure;
   2) performing a first thermal treatment comprising heating the ring structure at a brazing temperature of the brazing alloy for a first period of time;
   3) performing a second thermal treatment, subsequent to the first thermal treatment, comprising heating the ring structure at an intermediate temperature that is above the brazing temperature but below a gamma prime solvus temperature of the two metallic substrate segments for a second period of time;
   4) performing a third thermal treatment, subsequent to the second thermal treatment, comprising heating the ring structure at a super-solvus temperature that is above the gamma prime solvus temperature of the two metallic substrate segments for a third period of time; and
   5) subsequent to performing the third thermal treatment, cooling the ring structure to a temperature that is below the brazing temperature within a fourth period of time;
   subsequent to the cooling, bonding the ring structure to a hub;
   and
   inserting a blade into each of the plurality of slots to form the bladed disk.

14. The method of claim 13, wherein the first period of time is greater than about one hour.

15. The method of claim 13, wherein the second period of time is from about 10 minutes to about 4 hours.

16. The method of claim 13, wherein the third period of time is from about 10 minutes to about 4 hours.

17. The method of claim 13, wherein the fourth period of time is less than about 6 hours.

18. The method of claim 13, further comprising a performing a fourth thermal treatment after the second thermal treatment but before the third thermal treatment, wherein the fourth thermal treatment comprises heating the ring structure at a further intermediate temperature that is above the brazing temperature but below the gamma prime solvus temperature of the two metallic substrate segments for a fifth period of time.

19. The method of claim 18, wherein the temperature of the fourth thermal treatment is also greater than the temperature of the second thermal treatment.

20. The method of claim 13, wherein a range R is defined as a temperature range between the brazing temperature and the gamma prime solvus temperature, and wherein the second thermal treatment is performed at a temperature between a lowest decile of the range R and an uppermost decile of the range R.

* * * * *